Dec. 28, 1937.  E. W. N. BOOSEY  2,103,316
GREASE TRAP
Original Filed Feb. 15, 1934    3 Sheets-Sheet 1
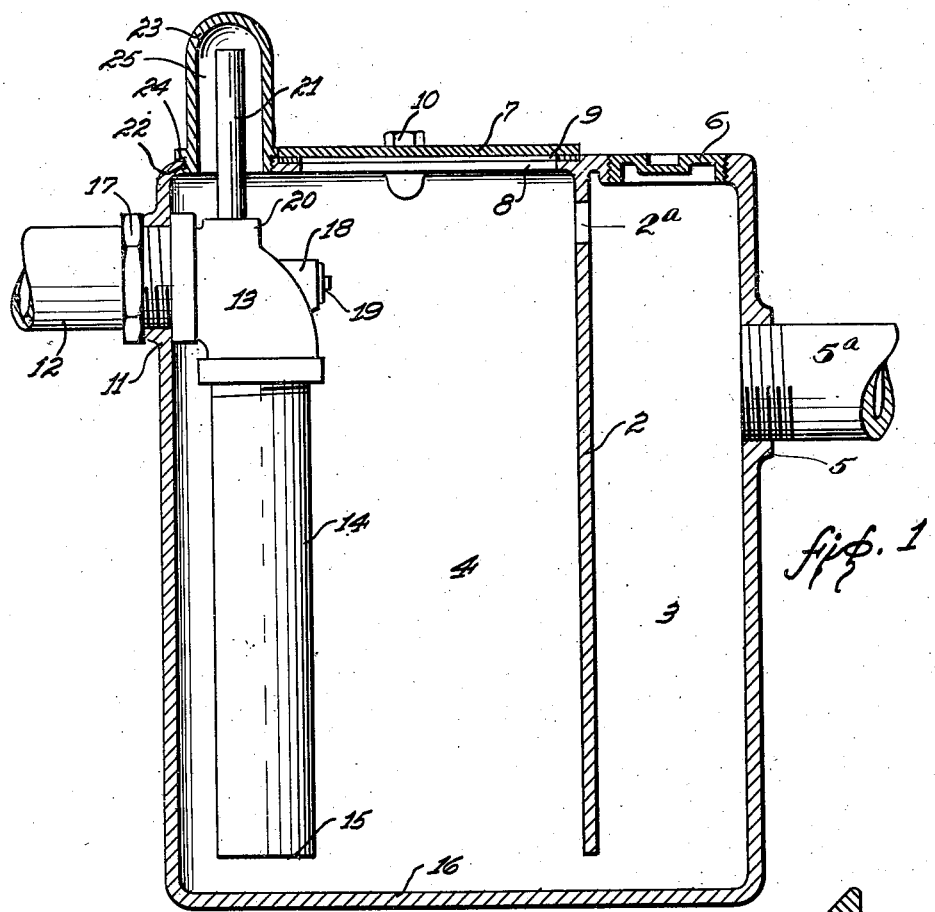
fig. 1
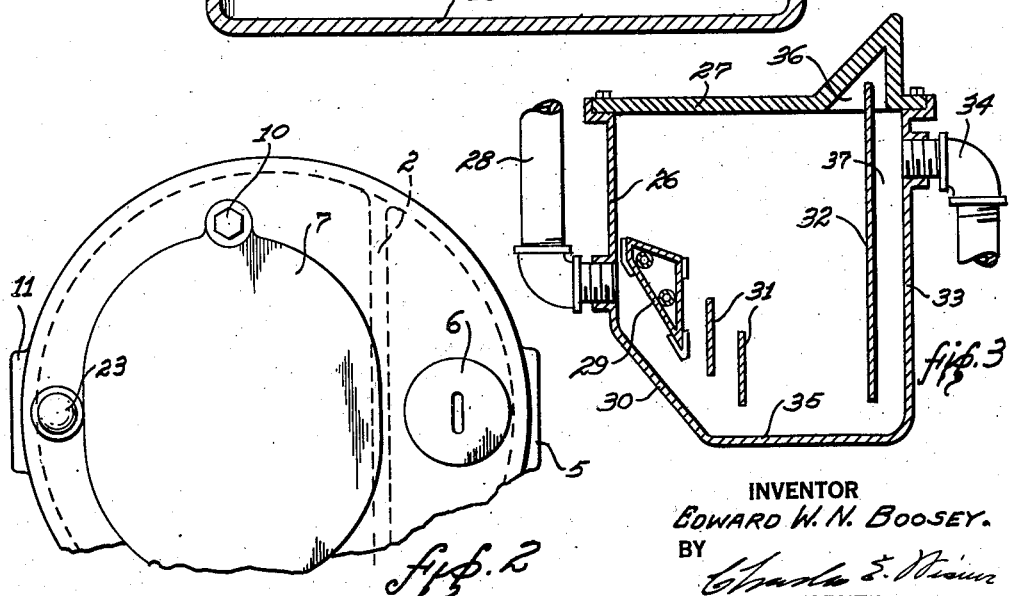
fig. 2
fig. 3
INVENTOR
EDWARD W. N. BOOSEY.
BY
ATTORNEY

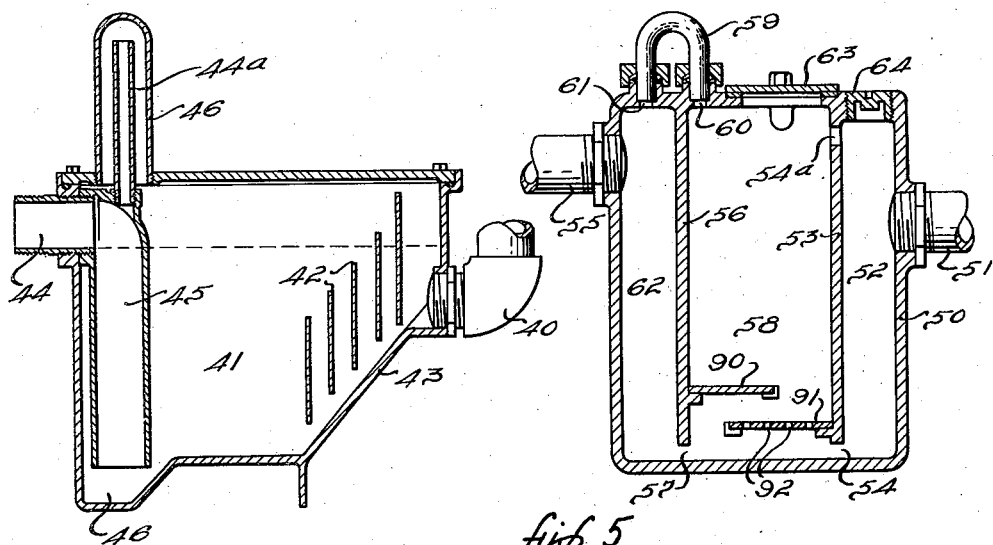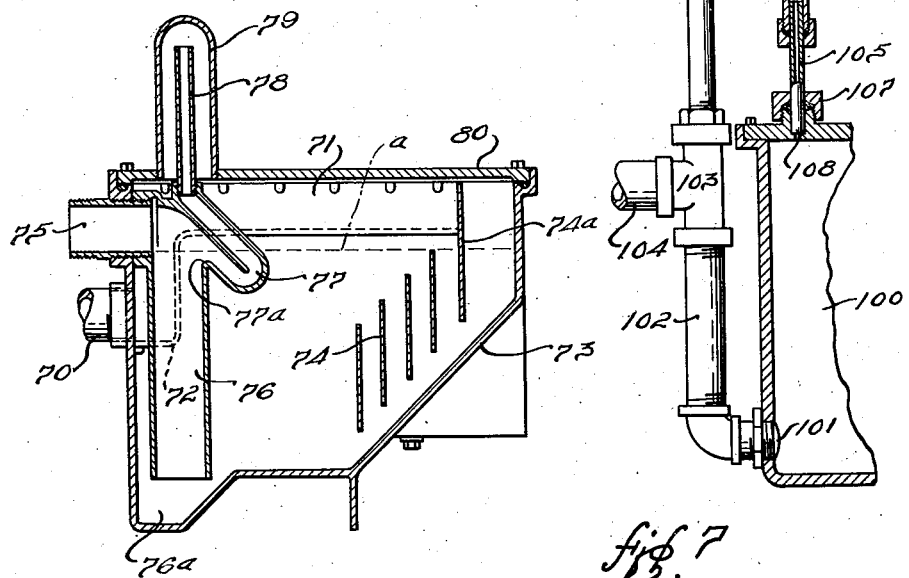

Dec. 28, 1937.   E. W. N. BOOSEY   2,103,316
GREASE TRAP
Original Filed Feb. 15, 1934   3 Sheets-Sheet 3

INVENTOR.
EDWARD W. N. BOOSEY.
BY
ATTORNEY.

Patented Dec. 28, 1937

2,103,316

UNITED STATES PATENT OFFICE 2,103,316

GREASE TRAP

Edward W. N. Boosey, Detroit, Mich.

Continuation of application Serial No. 711,311, February 15, 1934. This application July 21, 1934, Serial No. 736,340

17 Claims. (Cl. 182—9)

This invention relates to grease traps and is a continuation in respect to all common subject matter of my application Serial No. 711,311, filed February 15, 1934.

The object of the invention is to provide a sealed trap of such character that air or gas tending to accumulate in the upper part of the trap is discharged to the waste line and by the arrangement of such discharge, the siphoning of the trap is prevented.

The trap is adapted to be positioned in the waste line from a sink or other fixture in which greases or oils and water are discharged and is intended to prevent discharge of the greases and oils to the waste line and thence to a sewer. The fixture with which the trap is connected may be of various characters such as floor drains, sinks and the like into which grease is commonly discharged.

Heretofore, and particularly where the trap is placed beneath a sink in a building, gases accumulating in the upper part are ordinarily discharged through a vent pipe extending from the top of the trap to atmosphere. With such previous form of construction, the grease becoming hardened on the top of the liquid in the trap body prevents gases and air forced into the trap ahead of the discharge fluid from passing to the vent. Thus the air and gases accumulate and finally decrease the liquid level to such extent that the inflowing liquid passes directly to the waste outlet with its contained greases and the gases and air may accumulate to such degree as to force the liquid level to below the inlet in some constructions. Such undesirable arrangement and the cost of providing a separate vent for the trap is avoided by my improved construction as is hereinafter described.

By my improved construction and without necessity of a separate vent line, I have been able to prevent an accumulation of the gases in the body of the trap and also prevent a siphonage of the trap itself. In conjunction with such venting feature, the trap may have various forms of construction, it not being greatly material as will be understood from the following description, just what the internal construction of the trap may be but usually the inflowing fluid is discharged into or adjacent the bottom of the main chamber of the trap in order not to disturb greases and oils accumulating on the surface of the liquid in the trap and likewise the outlet opens to near the bottom of the grease separating chamber.

These and other objects and the various novel features of the invention are hereinafter more fully described and claimed, and various forms of grease traps embodying my invention are shown in the accompanying drawings in which—

Fig. 1 is a vertical section of a preferred embodiment of the invention.

Fig. 2 is a partial top plan view thereof.

Fig. 3 is a vertical section of another form of a trap embodying the invention in its simplest form.

Fig. 4 is a cross sectional view of a grease trap of somewhat different form than shown in Fig. 1 in which the invention is embodied.

Fig. 5 is a vertical section of a similar grease trap having a different form of construction of the means for discharging air from the upper part of the trap to the waste line.

Fig. 6 is a vertical section showing another construction of the means for discharging the air from the top of the grease trap in which the conduit for discharge of the air is provided with a self-filling trap to prevent back flow of the gases from a sewer.

Fig. 7 is a sectional view of the outlet side of a grease trap showing an alternative form of construction of the vent to the outlet.

Figure 8:
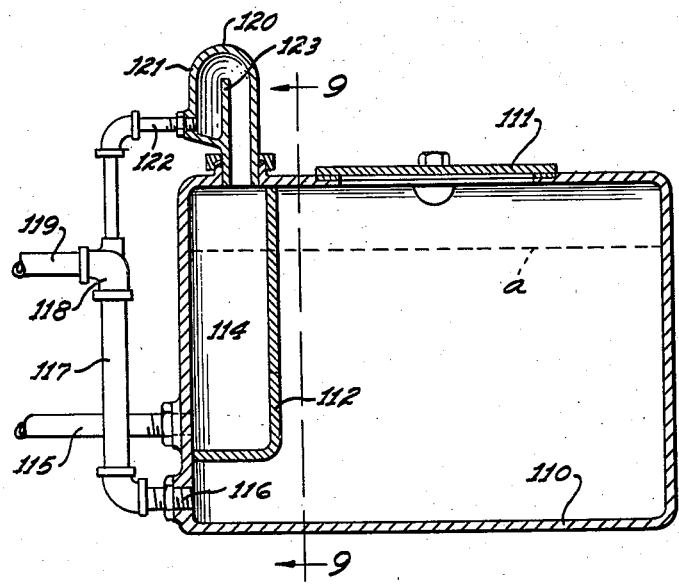
Fig. 8 is a vertical longitudinal section of another form of a vented grease trap taken substantially on line 8—8 of Fig. 9.

In Fig. 1 the trap body 1 is formed of cast metal and has a generally, although not necessarily, circular form as will be understood from Fig. 2. At one side of the center a transverse partition wall 2 is provided, it being spaced from the bottom of the trap body to provide for communication between the chamber 3 on one side of the partition and the main chamber 4. This partition has an opening 2a at the top for a purpose hereinafter described. Below the top the chamber 3 has a threaded hub 5 for an inlet conduit 5a, usually the waste line from a sink or other plumbing fixture, into which greases and water are discharged to pass to the trap. This chamber 3 has an opening provided with a cleanout plug 6 and the chamber 4 has a cover 7 detachably secured to the top and covering the opening 8, a gasket 9 being provided between the cover and the top surface of the body. The cover may be secured by bolts 10 at opposite ends or otherwise secured as may be desired.

The side wall of the chamber 4 opposite the inlet has a threaded hub 11 at the top which determines the final level in the chamber. Into the hub 11 is threaded the waste line 12, the inner end of which projects into the chamber and an elbow has one end threaded thereonto and the opposite end has a pipe 14 threaded thereinto and extending downwardly in a vertical plane, the open lower end 15 of which is spaced from the bottom wall 16 of the trap. A lock nut 17 may be provided on the pipe 12 as shown.

The elbow 13 has a small hub 18 formed thereon, the axis of which is practically in alignment with the axis of the waste line 12 and which is provided with a removable plug 19 accessible through the opening 8. The elbow 13 is also provided with a small hub 20 having a vertical threaded aperture to the interior of the elbow. Into this hub 20 is threaded a pipe 21 which extends vertically upward through a threaded opening 22 in the top wall of the trap. An open ended, cup-shaped member 23 is threaded into the opening which is sealed thereby and with which a gasket may be employed as indicated at 24. The cup member 23 provides a chamber which may be of any desired height and may be extended to above the normal water level in the sink or other plumbing element in the waste line of which the trap is connected. The upper end of the pipe 21 is open to the chamber 25 formed by the member 23 and, as this is in communication through its open end with the main or grease separating chamber 4 of the trap, any gases or air tending to accumulate in the top of the chamber can pass out to the waste line 12.

By the provision of the transverse wall 2, a vertical inlet chamber is provided which is in communication with the grease separating chamber 4 at the bottom so that fluid, passing into the chamber through the inlet 5a, may pass downwardly and thence to the chamber 4. The aperture 2a at the top of this transverse wall 2 permits the gases of the air passing into the chamber 3 through the inlet to rise and pass directly into the top of the chamber 4. Due to the fact that the fluid passes downward and into the bottom of the grease separating chamber 4, grease accumulating on the top of the liquid in the chamber 4 is not disturbed and the liquid, due to the spacing of the wall 2 from the outlet opening 15, is practically freed of grease before entering the open end 15 of the vertical portion 14 of the discharge outlet.

In the use of this trap and as before stated, the air in the waste line of the sink or other plumbing fixture which is connected with the threaded hub 5 of the trap body, with the first flow of liquid at least, is forced into the body of the trap. This inflow of liquid and air tends to decrease the level of the liquid in the chamber 3 and the air can pass into the top of the chamber 4 through the opening 2a.

The air and gases that tend to accumulate in the chamber 4 also flow into the chamber 25 and thence into the pipe 21 and thence to the waste line 12 of the trap. Thus air is prevented from accumulating in the upper part of the trap and the normal liquid level may be maintained therein at about the bottom line of the discharge or waste conduit 12. It will be noted that at each flushing of the sink or other fixture connected with this trap, some air continually passes into the chamber 4, the top of which therefore has in the past been ordinarily vented to atmosphere to prevent pressure accumulating therein and consequent lowering of the liquid level. By my arrangement and without necessity of carrying a vent up through a building to atmosphere, I am enabled to prevent an accumulation of air and gas under pressure in the top of the chamber 4 and also to prevent siphonage of the trap by discharging air into the outlet line 12.

This feature of venting of the grease retaining chamber may be secured in various ways without venting the trap to atmosphere and several examples are given to show several forms of construction within the scope of the invention as found in the appended claims.

In Fig. 3 a simple form of the invention serviceable for many situations is shown. In this form of construction, the body of the trap is indicated at 26 having a removable cover 27 and the waste line from the plumbing fixture, as indicated at 28, discharges into the body of the trap somewhat above the bottom. There are several deflector elements as for instance the element 29 which provides a deflector for the inflowing liquid to carry the same along the inclined portion 30 of the bottom wall and vertical plates 31 are provided which tend to skim the oils or greases from the top of the inflowing stream and permit the same to rise to the surface of the liquid in the body of the trap. With this form of the trap there is also provided a transverse wall 32 spaced from the wall 33 at the outlet side of the trap adjacent the upper end of which is connected the waste line 34 leading to the sewer. The wall 32 is spaced from the bottom horizontal wall 35 of the trap so that liquid in passing to the outlet conduit 34 is taken from the bottom of the trap subsequent to the greases and air having separated therefrom and risen to the top of the body of the liquid in the main chamber of the trap. To permit discharge of air and gases to the outlet 34 the wall 32 extends above the top of the trap and the cover is provided with a hollow chamber 36 that may be cast integral with the cover 27.

The chamber 36 on one side of the wall 32 opens to the grease separating or main chamber of the trap while the opposite side is open to the chamber 37 between the wall 32 and outer wall 33 of the trap on the outlet side. With this arrangement the normal liquid level is at the bottom line of the outlet opening of the trap to which discharge conduit 34 is connected. On the first rush of liquid into the trap, air that was contained in the conduit 28 also discharged into the trap and the liquid level rises. The air and gas that are in the trap will be placed under pressure if the liquid rises above the outlet and this pressure will be relieved as soon as the liquid level in the chamber 37 drops sufficiently to permit the air and gas to escape through the discharge conduit 34. Thus at each flushing, which carries both air and liquid into the trap, the greases are given an opportunity to rise in the main body, the clearer liquid passes beneath the wall 32 to the outlet 34 and the air and gases pass through the chamber 36 over the upper end of the wall to the outlet 34. Thus without use of the usual vent line to atmosphere this trap continuously discharges the clear liquid and air that is discharged thereinto. Siphonage is also prevented because the outlet line is open to a flow of air or gas which tends to prevent siphonage as will be readily understood.

In Fig. 4 I have shown a form of trap and gas venting means similar to that shown in Fig. 1 but in Fig. 4, the inlet conduit 40 from a sink or other plumbing fixture discharges into the body 41 of the trap intermediate the top and bottom.

Another form of my invention is shown in Fig.

5 in which the trap has a slightly different form of construction than that heretofore described. In Fig. 5, the trap body 50 has an inlet conduit 51 on one side which may be connected with the waste outlet of a plumbing fixture. This conduit discharges into the chamber 52 formed by the dividing wall 53 which is spaced at 54 from the bottom of the trap body and has an opening 54a through which air and gases may pass from the chamber 52 to the central chamber 58. The opposite outlet side of the trap has the conduit 55 connected therewith above the inlet in all general respects like the wall 53 adjacent the inlet being spaced from the bottom wall of the trap at 57 but is not provided with an opening in the top.

Liquid passing into the trap through the inlet 51 passes through the chamber 52 and space 54 to the main body portion of the trap and then passes through the space 57 and up to the outlet 55. In the main section 58, I provide baffles 90 and 91 which are preferably cast metal plates positioned in a horizontal plane and supported by lugs as indicated, the plate 90 being above the plate 91 and each of the plates while spaced apart extend more than half way across the chamber 58.

The plate 91 is provided with apertures 92 so that the fluid may pass upward and particularly oils and greases may freely rise in the main chamber 58 and these baffles, by reason of providing a tortuous path for the liquid, act to prevent too free a flow from the main chamber to the outlet and thus reduce the tendency to siphon. In the main chamber 58, the air, greases and oils rise to the top of the liquid therein and for the purpose of preventing an accumulation of air and gas in the upper part of this chamber 58, I provide a tube 59 opening at 60 to the top of the main chamber 58 and also opening at the opposite end 61 to the top of the chamber 62 to the upper end of which the outlet conduit 55 is connected. With this arrangement of parts, the function is the same as in structures heretofore described. The accumulated air and gases at each flushing of the plumbing fixture pass into the chamber 58 and as soon as liquid level is below the uppermost point of the outlet 55 the air and gas can pass to the said outlet preventing an accumulation of pressure within the trap and also tending to prevent siphonage of the trap. A cover member 63 is provided through which the accumulated greases may be removed and a plug 64 is also provided to permit cleaning the inlet chamber 52.

In Fig. 6 I have shown another form of grease trap and a particularly desirable form of the ventilating arrangement. It is oftentimes desirable that both the inlet and outlet be on the same side of the body and it is particularly desirable in this vented form of grease trap that the outlet be above the inlet and so arranged that the inflowing liquid does not disturb the accumulated grease on the top of the liquid in the body of the trap.

In Fig. 6 the inlet conduit is indicated at 70, it being understood that this is on the rear side of the body in the sectional view shown. Within the body and to which the inlet conduit opens is a trough like member 71 having openings in its upper edge to the top of the body and formed with a vertical portion 72 into which the liquid is first discharged and the upper horizontal portion thereof extends to the opposite side of the body opening through a vertical wall 74a. The liquid thence is passed downwardly to below the lower end of this wall 72 which is spaced from the inclined wall 73 and also beneath the vertically spaced baffles 74 in the body which are similar to the baffles 42 shown in Fig. 4. Forward or toward the observer in the view shown in Fig. 6 is positioned the outlet 75 which opens into a vertical conduit 76 having its open end in a recess 76a in the bottom of the body and to which liquid from the body of the trap passes. This conduit at the upper end is shaped to provide a trap 77 open at 77a to the vertical conduit 76 below the normal liquid level in the body indicated by the dotted line a. The upper inclined leg of this trap has a threaded aperture to receive an open ended pipe 78 positioned in a cup-shaped member 79 closed at the top and opening through the cover 80 to the air space above the liquid. In this structure, as the liquid level rises through inflow of waste liquid and gases, the air and gases may pass out through the trap 77 to the outlet.

It will be noted that, as discharge occurs through the outlet 75, the trap 77 is filled and the outlet in running full will tend to siphon the trap 77 thereby opening the pipe 78 to the outlet 75 and thus as the flow decreases, air passes out and breaks the siphon. Thereafter as the liquid level rises again to the level a as soon as the siphon is broken, the trap 77 is again filled. Under this condition, the cover member 80 may be removed without gases passing into the pipe 44a from the sewer which it is particularly desired to prevent in all installations where the body is desired to be opened within a building. The function of the structure shown in Fig. 6 is the same as in constructions previously described and has the added feature of preventing the escape of the gases from the sewer.

In either of the constructions Fig. 5 or 6, the conduit 59 or 78 may be of any desired height or to a point above the liquid level of the plumbing fixture in the waste line on which the pipe is connected. With this latter arrangement of the tubing there can be no discharge of liquid from the body through the conduits 59 or 78 and this is also true with the form shown in Figs. 1 and 4 when the venting members are carried to the proper height.

In Fig. 7 I have shown another form of construction in which the body 100 of the trap has an outlet opening 101 adjacent the bottom and a pipe 102 extends upwardly therefrom exteriorly of the trap body 100 to near the top of the body and is there provided with a T 103 to which the outlet conduit 104 connects, the position of which outlet determines the normal level of the liquid in the body. The vent consists of two telescoping tubes 105 and 106. The tube 105 has a slip connection with one downturned end of the tube 106 and by releasing the packing nut 107 the tube 105 can be raised from its connection with the main body by the aperture 108 and can then be manually freed of any greases that might accumulate and thus this construction provides for ready disassembly of the vent connection. The pipe 106 has also a downturned leg opening directly into the top of the fitting 103 which opens to the outlet and thus this vent device provides for a flow of air from the top of the body 100 to the outlet and functions in the same manner as the construction previously described.

Figure 9:
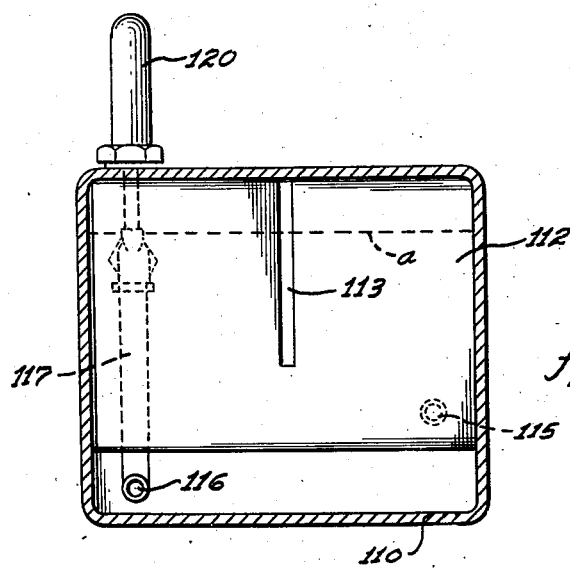
Fig. 9 is a vertical cross section taken on line 9—9 of Fig. 8.

In Figs. 8 and 9 is shown respectively a vertical longitudinal and vertical cross sectional view of another form of the trap. This form of the trap vents in the same general manner as the forms of the invention previously described. In this form the body of the trap is shown at 110 having a cover element 111 of the desired form and size through which the interior of the trap is accessible.

The cover is in sealed relation with the upper wall of the body and within the body is an L shaped partition member 112 which has a vertical slot 113 in its vertical leg providing a chamber 114. The inlet conduit 115 opens through the same wall of the trap body as the outlet and above the bottom of the chamber 114. Thus liquid discharging through the inlet does not flow directly into the main liquid body contained in the trap. The outlet opening 116 is below the inlet 115 and on the same end wall of the trap body but the inlet opens into this end wall toward one side of the body 110 while the outlet opens through the same wall and at a lower plane adjacent the opposite side of the body 110 as will be understood from Fig. 9. The inflowing liquid strikes against the solid vertical wall leg of the partition 112. To enter the main body of the trap the liquid has to rise to above the bottom of the slot 113 and then flows gradually into the body of the liquid but below the surface thereof indicated by dotted lines a. By this arrangement the grease entering the chamber 114 from the inlet can pass through the slot into the body of the trap and, as this slot runs from its bottom edge, as shown in Fig. 9, the upper wall of the body, the gases in the trap may pass freely into the top of the chamber 114 as well as in the top of the trap body.

The outlet is formed with a vertical portion 117 and this is connected to an elbow 118 to which a horizontal discharge or waste pipe 119 is connected. The height of this pipe 119 determines the level of the liquid in the tank. The top wall of the device, preferably at the top of the chambered portion 114, has a U tube 120, one leg of which opens through the top wall of the top body to the space at the upper end of the chamber 114. The other leg 121 of the U tube is closed at one end and to this end is connected a pipe 122 directly connected to and opening into the elbow 118 and therefore to the discharge conduit 119. This U portion 120 has a dividing wall 123 indicated by dotted lines, wherein it will be seen that gases from the top of the chamber 114 and of the body of the trap may pass up through one leg of the U 120 to a height above the water level of a connected fixture or otherwise as may be desired and thence into the discharge conduit 119. This form of the grease trap is desirable in many installations particularly where the inlet and outlet are required to be connected on the same sides of the trap. In each of the forms of the trap here shown, the venting of the trap is automatically provided for, the gases passing to the outlet when the outlet is open or no great quantity of liquid flows therethrough and in each of the forms shown siphonage is prevented as will be understood from the following:

When the liquid flows into the trap raising the water level to above the outlet, the outlet tends to run full. This produces a reduced pressure in the top of the trap body as the gases are drawn out through the discharge line 119. Thus, as soon as the flow is reduced in quantity so that there is air space in the outlet conduit 119, air will flow into the top of the trap body through the conduit due to the area of reduced pressure and siphonage is therefore prevented. This action, of course, is entirely automatic due to the construction and arrangement of the parts, gases accumulate in the top of the body both from decomposition of the material that may be within the body or on the surface of the fluid and air that may be discharged into the body through the inlet when the outlet is not full of liquid, the gases pass freely from the trap so that between the times of flushing the area above the liquid level is usually at atmospheric pressure. Then, as the trap flushes, the air is drawn off reducing the pressure below that of atmosphere preventing discharge of the entire liquid body by siphonage.

The various structures shown by the several drawings each involve a fundamental feature of the invention. The main chamber of the trap in each case provides for an accumulation of greases and oils on the surface of the liquid and to prevent such oils and greases passing directly to the outlet. In the form shown in Fig. 1, the outlet 13 is closed to the upper part of the chamber between the fitting 13 and the downwardly extending tubular member 14. However, the chamber is vented to the outlet by means of a tube 21 extending above the possible level of the accumulated oils and greases which, when hardened, may actually seal the chamber 25. The vent pipe 21 and the chambered element 25 extend above the possible liquid level in the plumbing fixture discharging to the trap. Therefore, the oils and greases may not accumulate to such height as to clog the vent. Thus I have provided means associated with the vent for preventing oils and greases from passing thereinto. This same result is attained by the structures shown in the various figures of the drawings each of which is provided with a form of vent and an arrangement of the same or means associated with the same for preventing rise of the greases and oils to the vent inlet.

It is also believed evident from the foregoing that the invention is of simple and inexpensive form, it being much less expensive than the usual vents to atmosphere and much more serviceable in the prevention of siphonage and further, that the various objects of the invention are attained by the construction described.

Having thus briefly described my invention, its utility and mode of operation, what I claim and desire to secure by Letters Patent of the United States is—

1. In a grease trap, a chambered body having an inlet conduit, an outlet conduit opening to the body of the trap below the normal liquid level therein, said outlet being positioned to determine the normal level of liquid below the top providing an air and gas space, a vent means for discharging gas and air from the said space to the outlet, and means associated with the vent for preventing greases and oils accumulated on the surface of the liquid from passing through the vent to the outlet, said vent means comprising a casing opening through the top of the body and providing an inlet for the vent.

2. In a grease trap, a chambered body having an inlet conduit and an outlet conduit both opening to the body of the trap below the normal liquid level therein, said outlet being positioned to determine the normal level of liquid below the top of the body providing an air and gas space, a vent means comprising a conduit having one end opening to the outlet conduit within the trap body and the opposite end in communication with the air space at the top of the trap body.

3. In a grease trap, a body having an inlet and an outlet, the said outlet determining the normal liquid level within the body, the inlet and outlet being spaced a distance to provide opportunity for greases and air to pass upwardly to the top of the body before passing to the outlet, said body being sealed directly to atmosphere, a removable cover therefor permitting access to the body, a vent means for the air and gas space comprising a conduit extending above the top of the body and having one end open to the outlet and the opposite end in communication with the upper portion of the body through the top wall thereof.

4. In a grease trap, a chambered body having an inlet and an outlet, the outlet having a portion extending into the body and being positioned to determine the normal liquid level therein below the top and providing an air and gas space thereabove, a vent pipe having one end opening to the outlet within the body and the opposite end being in communication with the said air and gas space above the possible liquid level in the body thereby preventing greases and oils accumulated on the surface of the liquid in the trap from passing through the vent pipe to the outlet.

5. A grease trap comprising a hollow body having an inlet conduit, an outlet conduit therefor spaced from the inlet whereby time interval is provided in the flow of liquid from the inlet to the outlet to permit grease and air content of the liquid body to rise to the surface, the position of the said outlet below the top of the body determining the normal liquid level in the body providing an air space thereabove, a chamber at the top of the body extending upwardly therefrom and open to the air space, and a pipe extending upwardly into the said chamber having an open upper end above the possible liquid level in the body, the opposite end opening to the outlet member.

6. A grease trap comprising a hollow body having an inlet conduit, an outlet conduit therefor spaced from the inlet whereby time interval is provided in the flow of liquid from the inlet to the outlet to permit grease and air content of the liquid body to rise to the surface, the position of the said outlet below the top of the body determining the normal liquid level in the body providing an air space, a chamber opening through the top wall of the body and extending upwardly therefrom and having an opening to the outlet.

7. A grease trap comprising a hollow body having an inlet on one side, an outlet near the top on the opposite side, said outlet opening to the body near the bottom, a wall in the said body adjacent the outlet and forming a continuation of the outlet conduit, said wall being spaced from the bottom of the chamber whereby flow of liquid to the outlet is from the bottom of the liquid body in the chamber, the said chamber having a top wall formed with an upwardly extending chamber therein, the said wall adjacent the outlet extending upwardly into the chamber and the upper end thereof being spaced from the upper end of the chamber thereby providing an air conduit opening on one side to the upper part of the chamber and on the opposite side to the upper part of the space between the said wall and outlet whereby air and gas accumulating in the upper part of the said body may discharge to the outlet as the liquid level falls below the uppermost point of the outlet.

8. A grease trap for connection in the waste conduit of a plumbing fixture comprising a chambered body to which the waste conduit discharges near the bottom, an outlet conduit on the opposite side and opening to the body adjacent the bottom, the point of connection of the said outlet conduit to the body determining the normal liquid level therein, a conduit having one end opening to the top of the body and the opposite end opening to the outlet, said conduit extending upwardly from the said top a distance above the possible liquid level in the fixture with which the trap is connected.

9. In a grease trap, a chambered body sealed directly to atmosphere, an inlet conduit, an outlet conduit opening to near the bottom of the body and having a portion positioned below the upper end of the body determining the normal liquid level in the body, there being an opening in the top wall of the body, a conduit associated with said opening closed to atmosphere and connected with the said outlet portion adjacent the top of the body, said conduit having an opening in communication with the air and gas space of the body and positioned above the possible liquid level in the body whereby the accumulated gases and air flowing into the body from the inlet may flow into the said outlet portion through influence of flow of liquid therethrough thereby preventing siphonage of the trap.

10. In a grease trap, a body having a main chamber, an outlet therefor on one side arranged to determine the normal liquid level in the body and having an opening to the main chamber above the bottom, an inlet conduit on one side opening to the body, means whereby liquid and grease discharging therethrough pass into the main chamber below the liquid level thereof and air discharging through the inlet passes to the top of the main chamber, a vent means opening through the top of the main chamber and discharging to the outlet, said means being constructed to prevent the greases and oils accumulating on the surface of the liquid in the main chamber from passing through the vent to the outlet.

11. In a grease trap, a body having a main chamber, an inlet conduit therefor, an outlet conduit on one side opening to the main chamber above the bottom thereof and positioned to determine the normal level of the liquid below the top providing an air and gas space thereabove, a vent means including a conduit having an inlet end above the possible liquid level therein and discharging to the outlet, and a chamber open to the body above the liquid level and into which the said vent pipe extends.

12. In a grease trap, a body having a main chamber, an outlet therefor on one side arranged to determine the normal liquid level in the body and having an opening to the main chamber below the liquid level, an inlet conduit opening to the body, means whereby liquid and grease discharging therethrough pass into the main chamber at the bottom and air discharging through the inlet passes directly to the top of the main chamber above the liquid level, and a vent device having an opening through the top wall of the chamber through which the gases and air in the top of the main chamber may pass directly to the outlet, said vent means being constructed to prevent flow of greases and oils accumulated on the liquid surface from passing through the vent means to the outlet.

13. In a grease trap, a body having an outlet on one side arranged to determine the normal liquid level thereof and having an opening to the interior of the body below the liquid level, an inlet conduit, a partition in the body adjacent the inlet providing a vertical chamber on one side of the body, said partition having an opening at the bottom and an opening at the top above the normal liquid level whereby liquid may pass beneath the partition and air discharging through the inlet may pass to the top of the body, and a vent means for the top of the body discharging to the outlet, said vent means being constructed to prevent greases and oils accumulating in the body from passing through the vent to the outlet.

14. In a grease trap, a chambered body having an inlet, an outlet arranged to determine the normal liquid level in the body and opening to the body below the said normal liquid level, a vent for discharging gas and air from the space to the outlet including a trap having one leg thereof open to the outlet below the normal liquid level in the body.

15. In a grease trap having an inlet conduit, an outlet conduit positioned on one side to determine the normal liquid level below the top providing an air and gas space and opening to the trap below the liquid level, and a vent means including a trap, one leg of which is open to the outlet below the normal liquid level of the body and the other of which is in communication with the air and gas space.

16. In a grease trap, a chambered body having an inlet, an outlet positioned to determine the normal liquid level in the body and opening thereto below said normal liquid level, a vent including a conduit open to the said air space and discharging to the outlet, and a trap in the said conduit arranged to be filled with liquid from the body after each flushing thereof upon the liquid rising to the normal level.

17. In a grease trap, a chambered body having an outlet therefor on one side arranged to determine the normal liquid level therein and opening to the body below the liquid level therein, an inlet conduit discharging to the said body, and a vent means for discharge of gases in the upper part of the body, said vent means including a passageway opening at one end to the interior of the body through the top and thence extending above the possible liquid level therein and at the other end in communication with the outlet.

EDWARD W. N. BOOSEY.